United States Patent [19]

Tratz et al.

[11] Patent Number: 4,770,390
[45] Date of Patent: Sep. 13, 1988

[54] VALVE FOR SHUTTING OFF A FLOW

[75] Inventors: Herbert Tratz, Ottensoos; Hans-Peter Schabert, Erlangen; Erwin Laurer, Möhrendorf, all of Fed. Rep. of Germany

[73] Assignee: Kraftwerk Union Aktiengesellschaft, Müheim, Fed. Rep. of Germany

[21] Appl. No.: 833,847

[22] Filed: Feb. 26, 1986

[30] Foreign Application Priority Data

Feb. 28, 1985 [DE] Fed. Rep. of Germany ....... 3507091

[51] Int. Cl.$^4$ ...................... F16K 31/04; F16K 31/53
[52] U.S. Cl. .................. 251/129.11; 74/785; 74/424.8 VA; 318/469
[58] Field of Search ...................... 74/785, 424.8 VA; 251/129.11; 318/469

[56] References Cited

U.S. PATENT DOCUMENTS 3,115,791 12/1963 Dean .................................. 74/785 X
3,616,884 11/1971 Balz ........................... 251/129.12 X
3,700,085 10/1972 Balz ........................... 251/129.12 X Primary Examiner—Arnold Rosenthal
Attorney, Agent, or Firm—Herbert L. Lerner; Laurence A. Greenberg

[57] ABSTRACT

A valve for shutting off a flow having a housing wherein a plug member is movable between "on" and "off" terminal positions by means of a thread; a rotary drive which is switchable off with time delay in the "off" terminal position of the valve; a resilient member for limiting an increase in torque generated by kinetic energy of the rotary drive in the "off" terminal position; and a torque control for the rotary drive includes means defining a range of rotation of the rotary drive in both directions of travel thereof, the entire range of rotation corresponding to a stroke of the plug member and being subdivided into a starting range beginning at one terminal position and ending before a new terminal position is reached as well as into the remaining range; the rotary drive having an available starting torque (break-away torque), taking into consideration the tolerance limit of the power supply in the starting range downwardly, which is at least 10% higher than the largest torque applicable by the rotary drive, taking into consideration the tolerance limit of the power supply in the remaining range upwardly.

5 Claims, 3 Drawing Sheets

VALVE FOR SHUTTING OFF A FLOW

The invention relates to a valve for shutting off a flow, and, more particularly, to such a valve having a housing wherein a plug or closure member is movable between "on" and "off" end or terminal positions by means of a thread; a rotary drive which is switchable off with time delay in the "off" end or terminal position of the valve; a resilient member which limits, in this end or terminal position, an increase in the torque generated by kinetic energy of the drive; and a torque control of the drive.

The drive is usually an electrical positioning drive with an electric motor which operates via a transmission. However, it may also be a pressurized-medium drive with compressed air, an hydraulic liquid or the like. The valve may be a sliding valve or a cock.

It is an object of the invention to provide valves of the foregoing general type which are less sensitive to disturbances which may be caused by long periods of disuse. In such cases, a considerable increase in the friction and the force required for motion can be caused by corrosion which has a detrimental effect on reliable operation. This is noticed particularly if the drive has moved the plug or closing member onto the closed position without any force or torque-dependent shut-off.

As may be seen from the safety engineering rules of the Nuclear Engineering Committee KTA 3504 "Electric Drives of the Safety System for Nuclear Power Plants" in the version of November 1984, considerable expense is required for solving this problem in nuclear power generating stations. In the chapter entitled "Design of Positioning Drives", it is specified that the drive can be operated with voltages between 80 and 110% of the nominal voltage. This has the effect of squaring the maximum producible torque which can therefore vary between 64% and 121% of the normal value i.e. almost by a factor of two. It has therefore become general practice to employ in positioning drives so-called travelling screws which cause a motor to be turned off dependent upon a torque accurate within 10%. These positioning drives can be used universally and are, therefore, also applicable for control valves. Because they are optimized for all applications, as shown in Siemens Catalog MP 35, 1980, they are, however, also correspondingly complex and costly both with respect to the space which is required as well as the number of electric wires that are to be connected.

It is an object of the invention, on the other hand, to provide for shut-off valves a greatly simplified positioning drive without a torque-dependent shut-off, which is of compact construction, makes do with few conductor wires (R, S, T, O) and, nevertheless, operates completely reliably. Switching elements should be provided in the valve, if possible, only in the form of two rugged end or terminal switches which furnish an end or terminal position indication which is purely for information only.

In determining the break-away torque which the positioning drive must supply, the coincidence of the following worst-case assumptions should be taken into consideration:

1. During the Closing Operation: The drive motor runs with overvoltage into the closest end or terminal position and is not switched off there (failure to turn off). The friction coefficient in the thread is low. The torque increase during fast braking is limited only moderately. There is no counterpressure against the plug or closure member. The stuffing-gland friction is small. These conditions lead to great stressing of the thread at the end of the closing operation.
2. During the Shut-Off Period: The friction coefficient in the thread is increased two to three times. The stress is increased by thermal expansion of the valve parts relative to one another. The stuffing gland is tightened and is thereby given increased adhesion.
3. During the Release Operation: The motor receives an under-voltage. The pressure difference at the plug or closure member attempts to keep it tightly seated.

The sum of these unfavorable factors can far exceed the favorable influence of the negative spindle pitch for the release. If the opening motion is limited by a rear seat which throttles the motion of the positioning drive, these factors occur there in the same manner.

The building block description (2.77) of the torque monitor BDW10 of the firm Sulzer shows an optimized electrical switching unit which replaces the mechanical torque measurement in the motor by an active-power measurement and thereby triggers the torque-dependent motor shut-off. The expense is considerable.

For shut-down failure, it is required by KTA 3504 merely that the valve parts be not damaged mechanically. Ordinarily, the freeing of the heavily jammed valve is left to manual intervention. In this regard, a built-in hammer-blow effect is mentioned in the bulletins of the firm Riester (Auma Drive) and the firm Rotork Controls Division (Rotork Drive).

The aforementioned favorable influence of the spindle pitch is based upon the fact that the force of the spindle jammed in an end or terminal position could turn the nut back by itself if only the spindle pitch is steep enough (multiple thread) or the friction in the thread (with rolling bodies) and in the nut contact becomes low enough. Such non-self-locking spirdles, however, require additional measures in the vicinity of the drive, for example, a worm screw, a motor brake or a separate brake. The tightness of the closed valve would depend upon a number of supplemental parts, the behavior of which, also when subject to vibration, would have to be examined carefully in advance. In the great majority of practical applications, the self-locking thread is therefore preferred. Reliable self-locking exists if a low coefficient of friction in the thread of, for example, 0.07 and a nut contact with needle bearings are assumed.

With the foregoing and other objects in view, while taking the aforementioned boundary conditions into consideration, there is provided, in accordance with the invention, a valve for shutting off a flow having a housing wherein a plug member is movable between "on" and "off" terminal positions by means of a thread; a rotary drive which is switchable off with time delay in the "off" terminal position of the valve; a resilient member for limiting an increase in torque generated by kinetic energy of the rotary drive in the "off" terminal position; and a torque control for the rotary drive, comprising means defining a range of rotation of the rotary drive in both directions of travel thereof, the entire range of rotation corresponding to a stroke of the plug member and being subdivided into a starting range beginning at one terminal position and ending before a new terminal position is reached as well as into the remaining range; the rotary drive having an available starting torque (break-away torque), taking into consideration the tolerance limit of the power supply in the starting range downwardly, which is at least 10% higher than the largest torque applicable by the rotary drive, taking into consideration the tolerance limit of the power supply in the remaining range upwardly. What is achieved thereby is that the drive opens the valve reliably again, because then, a greater force can be applied than for the motion into the end or terminal position.

The valve according to the invention is developed further in different ways. Thus, in accordance with another feature of the invention, there is provided means for turning the rotary drive off at the earliest 0.5 seconds after the end of the running time required for the entire range of rotation.

In accordance with a further feature of the invention, the rotary drive is an electric drive motor, and including means for reducing the supply voltage of the electric drive motor by at least 10% in the remaining range relative to that in the starting range; the reduction being triggerable in dependence upon a parameter selected from the group of parameters consisting of travel distance and time.

In accordance with an added feature of the invention, the electric motor is a three-phase motor with a squirrel cage rotor, and has a break-away torque which is at most equal to the starting torque. The electric motor, after traversing the valve stroke, is thereby prevented from exerting an undesirably large force in the closed position or at a stop limiting the opening stroke. Electric motors with such characteristics are known and can be obtained commercially.

The invention can also be realized advantageously if the thread for moving the plug or closure member is self-locking. Thus, in accordance with an additional feature of the invention, the valve has a self-locking thread, and the starting range includes an idle angle of 3° to 180° wherein the rotary drive is rotatable and acceleratable freely relative to a rotatable threaded member, and a small additional angle wherein kinetic energy of the rotary drive is passed without attenuation to the rotatable threaded member in such manner that the torque is more than doubled.

In accordance with yet another feature of the invention, the magnitude of the idle angle and the ratio of voltage decrease are so matched to one another that the electric drive motor at full voltage reaches more than 90% of its nominal speed, whereas, at reduced speed, a maximum of 50% is reached; and including entrainers, at the end of the idle angle, for converting thereat the energy of rotation of the drive motor into an instantaneous power peak which, at full voltage, causes the possibly jammed thread to break loose; and, respectively, means for holding the rotary drive in the idle angle range in the starting position on the side of the terminal position (for example, by means of a brake) and means for initially returning the rotary drive thereto (for example, by lowering the voltage at the electric motor).

In case of a jamming of the valve, "break-away" can also be achieved by repeated attempts at actuation. To this end, and in accordance with yet a further feature of the invention, the control of the electric motor has means for triggering a reverse and forward motion until the plug member leaves the range of the closed terminal position (for example, 20% of the stroke).

Matching the torque furnished by the drive to the power requirement is achieved, in accordance with yet an added feature of the invention, by providing a friction brake for loading the rotary drive in the remaining range for reducing the torque available in the thread by at least 10% with respect to its value in the starting range.

In accordance with yet an additional feature of the invention, the starting range is prescribed as the idle angle between a threaded nut and the friction brake, the friction brake being formed as a brake sleeve having a roller bearing facing towards a spindle nut, and having a slide bearing facing towards the housing; the idle angle being smaller than a full revolution of the rotary drive.

In accordance with another feature of the invention, there is provided a switching transmission located between the rotary drive and the rotatable threaded member for producing, in the starting range, a torque increase by at least a factor of 1.2 (preferably 3.0) relative to the torque of the rotary drive in the remaining range.

In accordance with a further feature of the invention, the switching transmission is a branching transmission (especially, a planet gear transmission) having three shafts including a drive shaft entraining a driven shaft at the end of the starting range, the relative torque transmitted by the entraining drive shaft leading to an automatic switching motion for releasing a third shaft of the branching transmission from a position wherein it is fixed against rotation relative to the transmission housing as long as the torque exceeds a predeterminable value.

In accordance with an added feature of the invention, there is provided an entrainer having a stop and a roller running against an incline having a slope of 20° to 70°, and the position fixed against relative rotation being set by a friction brake (preferably a multiple disc brake) pretensioned by an axial spring.

In accordance with an additional feature of the invention, there are provided distance-dependent terminal switches for picking up spindle positions, the terminal switches being actuatable for performing at least one of the functions of switching off the rotary drive in the open position, controlling an automatic repetition device and obtaining a possible trouble signal after an unsuccessful expiration of the predetermined travel time.

In accordance with yet another feature of the invention, the open position is defined by an opposing stop (preferably a rear seat); a further resilient member located at the stop for limiting increase in the torque; the construction for the closed position being provided symmetrically for the open position.

In accordance with a concomitant feature of the invention, the rotary drive, the threaded member and intermediate members are structurally combined to form a thrust drive.

Other features which are considered as characteristic for the invention are set forth in the appended claims.

Although the invention is illustrated and described herein as embodied in a valve for shutting off a flow, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
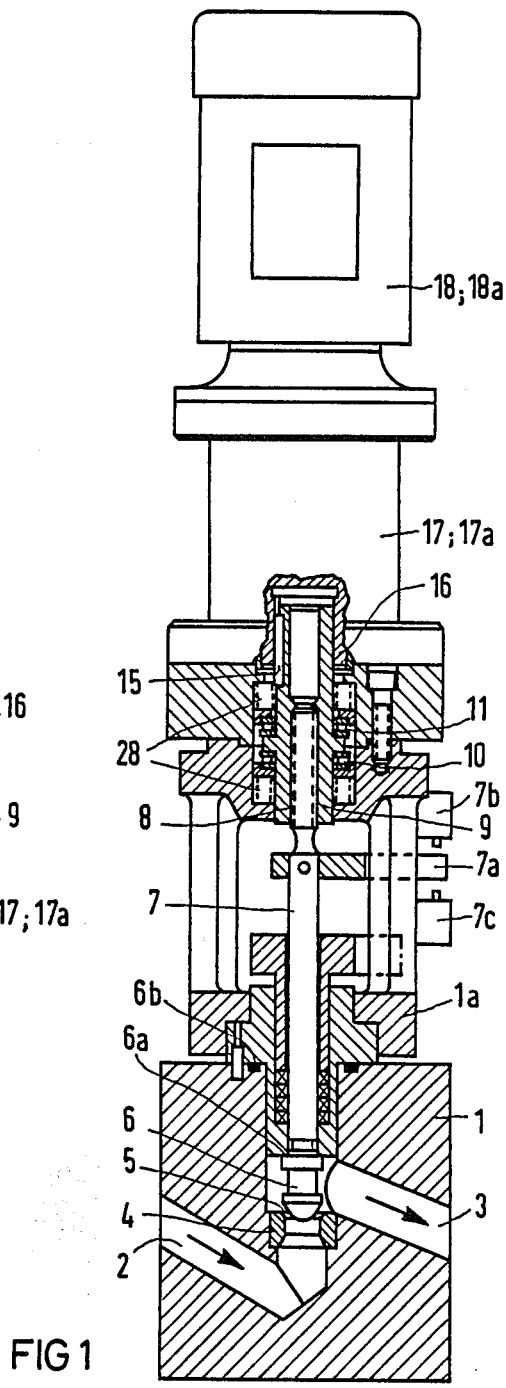
FIG. 1 is a side elevational view, partly in section, of a valve for shutting off a flow according to the invention.

Referring now to the drawing and first, particularly to FIG. 1 thereof, there is shown a shut-off valve according to the invention having a housing 1 with an inlet channel 2 and an outlet channel 3. A valve seat 5 with an inside diameter of 25 mm formed by a pressed-in bushing 4 disposed between the channels 2 and 3 cooperates with a plug or closure member 6 which is actuated by a steel spindle 7.

The steel spindle 7 has a trapezoidal thread 8 with a diameter of 16 mm and a pitch of 4 mm with which it is seated in a bronze nut 9 supported by two roller bearings 10 and 11. The nut 9 is coupled, substantially without play, by a key 15 to the drive shaft 16 of a planetary gear or transmission 17 which can be set in motion by a three-phase electric motor 18 flanged thereto. The three-phase motor has a rated power of 0.37 kW and a short-circuit rotor, the break-away torque of which is not greater than the starting torque thereof. This starting torque is set to a value of 30 Nm at the rated voltage by the transmission 17. Upon rotation of the nut 9, the spindle 7 is shifted in longitudinal direction thereof over a stroke of 8 mm until the plug member 6 reaches a second valve seat 6a, the so-called rear seat, which limits the positioning travel and relieves the following tight packing 6b of the pressure of the medium (for example steam). The entire setting time is about 1 second.

The spindle 7 is prevented by an entrainer fork 7a from concurrently rotating during the rotary movement of the nut 9. The fork 7a actuates an upper terminal switch 7b and a lower terminal switch 7c, each of which is responsive 2 mm before reaching the appertaining end position.

When the terminal or end positions are reached, the moment of the motor rotor is braked, and an increase in the torque on the nut 9 occurs. In order to limit this increase to a value of about 30%, cup spring packets 28 are provided, the elasticity of which is added to the resiliencies of the spindle 7, the valve lantern 1a and the transmission 17. The otherwise non-illustrated three-phase current supply of the motor 18 is constructed so that the voltage remains constant within ±10%. This has the effect of squaring the starting torque and the latter can therefore vary between +21% and −19%. In addition, the power supply is equipped with two time delay stages.

For once, the motor voltage is reduced (by means of a series resistor, a transformer or the like) to 58% of its initial value after a partial stroke of 40% (about 0.5 sec). The motor therefore develops only a third of the torque if it is throttled at the end of the opening stroke after 1 second. The torque increase due to the momentum is added to this third.

The second time delay member disconnects the power supply after two seconds so that the winding of the stalled motor is not overheated.

Upon closing the valve, the end or terminal position switch 7c has given its signal until this point in time. If the signal is missing, a purely informative trouble signal can be formed.

A further trouble signal can be formed in case the motor voltage should not yet have dropped to a value below 75% of its initial value when the end or terminal-position switch responds. This trouble signal would mean that the valve has run into its end or terminal position with too great momentum.

Upon reopening the valve, the process takes place in an analogous manner with a reversed direction of rotation of the motor.

Figure 2:
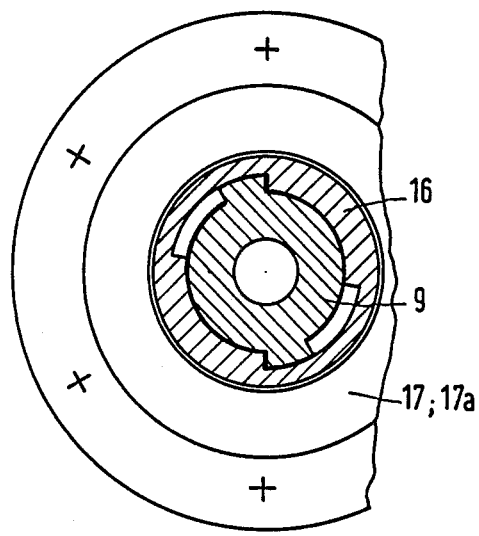
FIG. 2 is a cross-sectional view of FIG. 1 taken along a plane through the transmission output shaft with an idle angle and showing a modification of the valve.

FIG. 2 shows a modification of the arrangement according to FIG. 1. The self-locking nut 9 is no longer connected to the transmission output shaft 16 without play. Rather, an idle angle of rotation of 50° is provided. During this idle angle, the motor 18 can reach more than 90% of its full speed and can develop, at the flank of the nut 9 acting as an entrainer, a hammer-blow effect which leads to an especially high break-away torque.

An otherwise non-illustrated gently acting brake 17a is built into the transmission 17 and continuously consumes about 7% of the full torque (2 Nm). It ensures that the motor does not turn back unintentionally after it has reached the end position and thereby lose partly or entirely the ability to accelerate within the idle angle of rotation.

The continuous brake 17a can, of course, be replaced by an otherwise non-illustrated brake 18a associated with the motor, with actuation by a magnet or a sliding armature.

Replacement is also possible by providing that the stalled motor not be turned off completely after 2 seconds, but rather that a residual three-phase voltage of 30% remain for heating the motor winding only moderately in spite of the continued load.

A small residual voltage can be added also only shortly (for example, 1 second) before the intended opening actuation of the valve. This voltage would then accelerate the motor initially in the closing direction, to below 50% of its speed, within an idle angle which can be between 0° and 50°, execute a slight, insignificant hammer blow in the closing direction and then, in the reversed direction of rotation strike with full force in that direction which leads away from the end or terminal position. This process can be automated by simple time delay members and can even be organized repetitively, if necessary or desirable.

Figure 3:
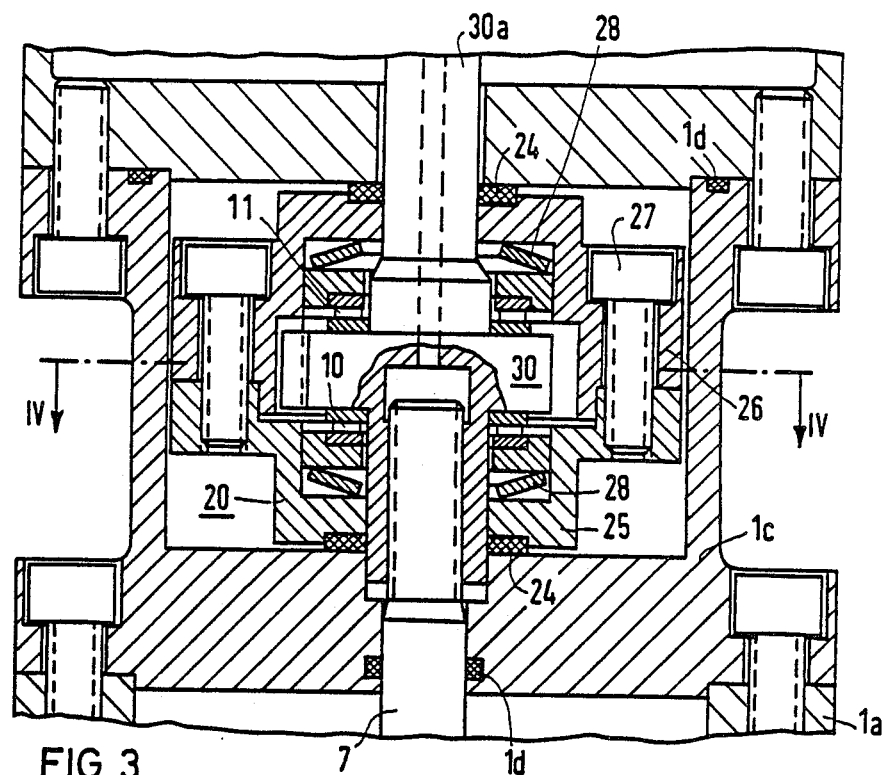
FIG. 3 is an enlarged fragmentary view of FIG. 1 showing another embodiment of a braking sleeve which surrounds the threaded nut.
Figure 4:
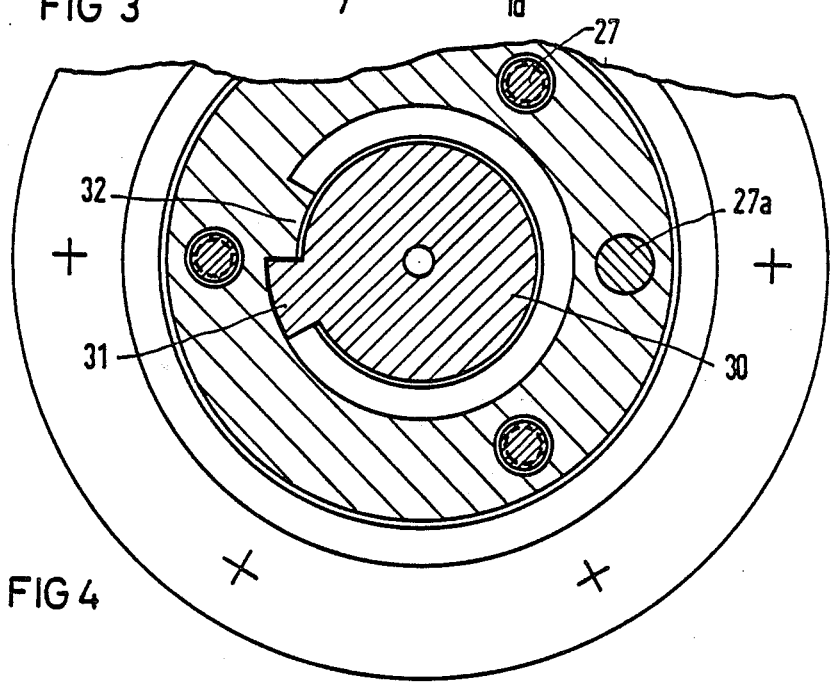
FIG. 4 is a cross-sectional view of FIG. 3 taken along the line IV—IV in direction of the arrows.

In FIGS. 3 and 4, there is shown a braking sleeve identified as a whole by reference numeral 20, within which the threaded nut 30 can rotate on its roller bearings 11 and 10 with low friction. The shaft extension 30a of the threaded nut 30 engages the output shaft 16 of the drive 17, 18 shown in FIG. 1 and receives the required torque therefrom. The nut 30 actuates the threaded spindle 7, which is secured against rotation, and the plug or closure member 6 fastened thereto (FIG. 1). After an idle angle of rotation of 330°, the nut 30 also turns therewith the braking sleeve 20 which is braced with sliding surfaces at the end face against the brake housing 1c. Under the action of an axial force in the spindle 7, a braking torque is produced which is, for example, about twice as large as the torque required for the same spindle force without braking at the nut 30. Of a given stalling torque, for example, 30 Nm, of the drive 17, 18, only 10 Nm are available for generating the spindle force i.e., only one-third of the value without a braking sleeve. On turning back, however, the braking over the idle angle region is eliminated, so that the valve can open with great reliability. The braking sleeve 30 is a housing which is formed of two shells 25 and 26 which are connected by screws 27 and a dowel pin 27a. The end faces of the shells are equipped with bronze washers 24 having friction surfaces on the end faces thereof which are provided with radial grooves, so that no adherent lubrication film can form thereon. Elastomeric O-rings 1d protect against the loss of the grease charge in the brake housing 1c. The brake housing 1c is mounted on the valve lantern 1a.

Figures 5, 6:
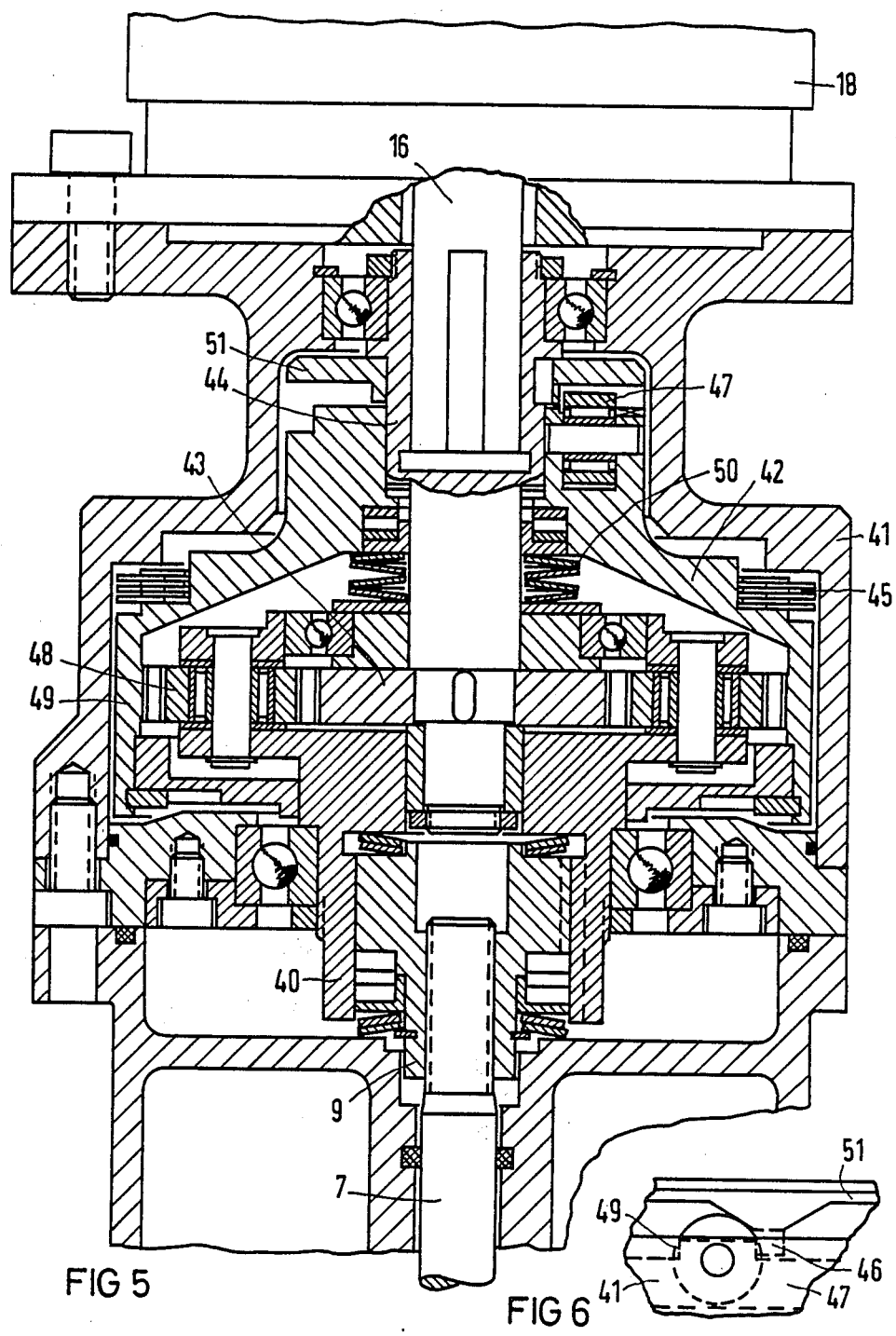
FIG. 5 is a view similar to that of FIG. 3 of a branching transmission which serves for increasing power in the end positions.
FIG. 6 is a fragmentary plan view of FIG. 5 showing details of the valve.

In the embodiment according to FIG. 5, a planetary gear 41 is provided which increases the torque of the output shaft 16 of the drive 18 by a factor of three. The increased torque is passed by the planetary-gear carrier 40 to the threaded nut 9 which actuates the spindle 7.

The increased part of the torque must be taken up, as in any branching transmission, by a third shaft which is independently secured against rotation. This third shaft has the shape of a bell body 42 with an internally toothed hollow ring 49, with which three planetary gears 48 mesh. This bell body 42 is prevented from rotating by a multiple disc brake 45. A sun gear 43 is fastened on the transmission shaft 44 secured against rotation, whereas the planet carrier 40 can turn relative thereto. However, the relative rotation is limited to about 340° by the stop 46 which is part of a disc 51 rotating together with the gear shaft 44.

As is apparent from FIG. 6, a roller 47 built into the bell body 42 comes to lie against a 30° incline of the driver cam 51 shortly before reaching an opposing stop 49 which is milled out of the bell body 42. The instant a relative torque between the transmission shaft 44 and the bell body 42 is created, the roller 47 moves this bell body 42 in axial direction against a pre-tensioned cup spring packet 50. This releases the multiple-disc brake 45, so that the function of the branching transmission (1:3) changes into pure transmission of the torque (1:1). The transition from the one to the other mode of operation is not abrupt. As long as the relative torque generated by the counterforce of the spindle 7 remains moderate (for example, 25% of the design value), the roller 47 can compress the cup spring 50 only partly. Accordingly, the multiple disc-brake 45 slips through with a residual resistance which becomes smaller to the extent that the spindle requires more force.

As can be seen from FIG. 5, the nut 9 and the spindle 7 are assembled tightly together with the branching transmission and the motor. This compact unit can be contracted with connecting flanges and the like in such a way that the term thrust drive unit is applicable.

In many valves, primarily slide valves, one revolutions of the drive or a ½-revolution of the spindle is too little to get free of the end or terminal position. In this case, assurance may be provided by a non-illustrated supplemental mechanism that the driver disc 51 will come into engagement with the stop 46 and the roller 47 only after two or more drive revolutions.

The branching transmission according to FIG. 5 requires a relatively low torque at the motor when compared to the other embodiments of the invention. It is especially well suited for being driven by a multi-pole, so-called rotating-field magnet which is constructed for stalled operation. Such a 16-pole motor, for example, when compared to a 4-pole motor with transmission is especially insensitive to overheating the winding also in the face of repeated switching, and develops, owing to its small kinetic energy of rotation, an especially slight increase in the torque when the end or terminal positions of the valve are approached. The primitive addition of the unregulated three-phase voltage and its disconnection again by means of a time delay stage permit the valve to function reliably on many applications.

The foregoing is a description corresponding in substance to German application No. P 35 07 091.9, dated Feb. 28, 1985, the International priority of which is being claimed for the instant application, and which is hereby made part of this application. Any material discrepancies between the foregoing specification and the aforementioned corresponding German application are to be resolved in favor of the latter.

We claim:

1. Valve for shutting off a flow having a housing wherein a plug member is movable in one stroke between "on" and "off" terminal positions; a rotary drive which is switchable off in the "off" terminal position of the valve; a resilient member for limiting an increase in torque generated by kinetic energy of the rotary drive in the "off" terminal position; and a torque control for the rotary drive, comprising means defining a given total angle of rotation of the rotary drive in both rotary directions of travel thereof, the total angle of rotation corresponding to one stroke of the plug member and being the sum of a first and a second partial angle of rotation, said first partial angle of rotation beginning at one terminal position and ending before a new terminal position is reached, said new terminal position being also preceded by part of said second partial angle of rotation; the rotary drive having an available starting torque (break-away torque) which is higher than the larges torque applicable by the rotary drive, a switching transmission located between the rotary drive and a rotatable threaded member for producing said starting torque, in said first partial angle of rotation, said starting torque being greater by at least a factor of 1.2 than said largest torque applicable by the rotary drive.

2. Valve according to claim 1 wherein said switching transmission is a branching transmission having three shafts including a drive shaft entraining a driven shaft at the end of the first partial angle of rotation, the relative torque transmitted by said entraining drive shaft leading to an automatic switching motion for releasing a third shaft of said branching transmission from a position wherein it is fixed against rotation relative to the transmission housing as long as said torque exceeds a predeterminable value.

3. Valve according to claim 2, including an entrainer having a stop and a roller running against an incline having a slope of 20° to 70°, and said position fixed against relative rotation being set by a friction brake pretensioned by an axial spring.

4. Valve according to claim 2, including distance-dependent terminal switches for picking up spindle positions, said terminal switches being actuatable for performing at least one of the functions of switching off the rotary drive in a given position, controlling an automatic repetition device and obtaining a possible trouble signal after an unsuccessful expiration of the predetermined travel time.

5. Valve according to claim 4, wherein said given position is defined by an opposing stop; a further resilient member located at said stop for limited increase in the torque; the construction for second given position being provided symmetrically for said first-mentioned given position.

* * * * *